(12) United States Patent
Martin et al.

(10) Patent No.: US 6,700,527 B1
(45) Date of Patent: Mar. 2, 2004

(54) COHERENT TWO-DIMENSIONAL IMAGE FORMATION BY PASSIVE SYNTHETIC APERTURE COLLECTION AND PROCESSING OF MULTI-FREQUENCY RADIO SIGNALS SCATTERED BY CULTURAL FEATURES OF TERRESTRIAL REGION

(75) Inventors: Gayle Patrick Martin, Merritt Island, FL (US); John W. Shipley, Sebastian, FL (US)

(73) Assignee: Harris Corporation, Melbourne, FL (US)

( * ) Notice: Subject to any disclaimer, the term of this patent is extended or adjusted under 35 U.S.C. 154(b) by 257 days.

(21) Appl. No.: 09/713,378

(22) Filed: Nov. 15, 2000

(51) Int. Cl.[7] ............................................. G01S 13/90
(52) U.S. Cl. ................. 342/25; 342/173; 342/174; 342/191; 342/192; 455/12.1; 455/226.1; 455/427
(58) Field of Search ............................. 455/423–425, 455/63, 62, 12.1, 13.1, 427, 226.1; 342/172–178, 25, 191, 192, 199

(56) References Cited

U.S. PATENT DOCUMENTS

| | | | |
|---|---|---|---|
| 5,659,318 A | * 8/1997 | Madsen | 342/25 |
| 5,767,802 A | * 6/1998 | Kosowsky | 342/45 |
| 5,805,098 A | * 9/1998 | McCorkle | 342/25 |
| 5,940,737 A | * 8/1999 | Eastman | 455/3.2 |
| 6,232,922 B1 | * 5/2001 | McIntosh | 342/453 |
| 6,384,766 B1 | * 5/2002 | Ulander | 342/25 |
| 6,400,306 B1 | * 6/2002 | Nohara | 342/25 |
| 6,424,290 B1 | * 7/2002 | O'Neil | 342/55 |
| 6,466,156 B1 | * 10/2002 | Ulander | 342/25 |
| 6,518,914 B1 | * 2/2003 | Peterson et al. | 342/25 |

* cited by examiner

*Primary Examiner*—William Trost
*Assistant Examiner*—Brandon Miller
(74) *Attorney, Agent, or Firm*—Allen, Dyer, Doppelt, Milbrath & Gilchrist, P.A.

(57) ABSTRACT

An imaging system uses wideband 'RF daylight' created by plural narrowband RF illumination sources, to passively generate spectrally different sets of RF scattering coefficients for multiple points within a prescribed three-dimensional volume being illuminated by the narrowband RF transmitters. To correct for the lack of mutual coherence among different RF illumination sources, the respective sets of scattering coefficient data are applied to a cultural feature extraction operator, to locate one or more strong cultural features spatially common to multiple images. For spatial points along the extracted cultural feature theoretical scattering coefficients are calculated. Differences between phase values of these calculated scattering coefficients and those of the collected and processed scattering energy are used to modify the measured scattering coefficient values for all spatial points in the illuminated region. This allows the scattering coefficients of that narrowband frequency set to be coherently combined with those of another spectrally different narrowband set of scattering coefficients whose phase components have been similarly corrected, based upon the same extracted cultural feature.

24 Claims, 5 Drawing Sheets

FREQUENCY

COHERENT TWO-DIMENSIONAL IMAGE FORMATION BY PASSIVE SYNTHETIC APERTURE COLLECTION AND PROCESSING OF MULTI-FREQUENCY RADIO SIGNALS SCATTERED BY CULTURAL FEATURES OF TERRESTRIAL REGION

CROSS-REFERENCE TO RELATED APPLICATION

The present application relates to subject matter disclosed in U.S. patent application, Ser. No. 09/713,637, filed coincident herewith, by G. P. Martin et al, entitled: "Image Formation by Passive Collection and Processing of Radio Frequency Signals Illuminating and Scattered by Cultural Features of Terrestrial Region" (hereinafter referred to as the '637 application), assigned to the assignee of the present application and the disclosure of which is incorporated herein.

FIELD OF THE INVENTION

The present invention relates in general to electromagnetic energy collection and processing systems, and is particularly directed to a method and apparatus for generating a two-dimensional image of a terrestrial region of interest, by passively collecting and processing scattered radio waves illuminating the terrestrial region from a plurality of narrowband RF emission sources, such as commercial television transmission towers, that effectively correspond to a composite wideband illumination source (e.g., of the type employed in synthetic aperture radar applications).

BACKGROUND OF THE INVENTION

Conventional schemes for generating images of objects or scenes include a variety of energy illuminating and collection methodologies, such as visible and infrared light-based processes (e.g., photography), and coherent electromagnetic radiation-based processes (e.g., synthetic aperture radar (SAR) and holography). While conventional (non-coherent) light-based photography allows image capture of exterior surfaces of objects in a scene, it does not create an image of where the light cannot go (behind the exterior surface of an object, such as into the interior of a building or beneath a vegetation canopy, in the case of visible light).

Synthetic aperture radar and holography use coherent electromagnetic radiation (e.g., narrow bandwidth radar pulses in the case of SAR and coherent light in the case of holography) to construct an image. Advantageously, because it processes volume-based (rather than planar-based) differential phase information, holography is able to provide for the generation of a three-dimensional image of an object. Still, its use to date has been essentially limited to controlled, volume-constrained static environments, such as an opto-physics laboratory.

There are many terrestrial regions, such as cities, industrial areas, and the like, containing a wide variety of cultural features, such as buildings, bridges, towers, etc., as well as interior components thereof, for which images (including those captured at different times for determining the presence of environmental changes) are desired by a variety of information analysis enterprises. Curiously, many if not most of such terrestrial regions are continuously illuminated by one or more relatively powerful narrowband radio frequency (RF) transmitters, such as television broadcast towers, creating a condition known as 'RF daylight'.

Because of the partial transparency to such RF emissions (especially at and below VHF and UHF frequencies) of many objects, including both natural vegetation and man-made structures, these RF-daylight signals can be expected to be reflected/scattered off cultural features (including both exterior and interior surfaces) of an illuminated region.

Advantageously, the invention described in the above-referenced '637 application takes advantage of this RF daylight phenomenon, by passively generating, for multiple points within a prescribed three-dimensional volume illuminated by a coherent RF transmitter, such as a commercial television transmission tower, RF reflectance/scattering coefficient values from which a three-dimensional image of cultural features within the illuminate volume may be derived.

For this purpose, the invention described in the '637 application contains a front end, RF energy collection section having a reference signal collector (antenna) which collects non-scattered RF energy emitted by an RF reference source illuminating the potentially cultural feature-containing terrestrial region of interest. A second, dynamic scattered image energy collector, mounted on a platform overflying the illuminated terrestrial region, collects RF energy that has been scattered—reflected from various points of cultural features (such as buildings and contents thereof) within a three-dimensional volume of space containing the terrestrial region.

Dynamic collection of the scattered RF image energy is conducted over plural non-coincident travel paths (such as those extending from horizon-to-horizon), to ensure that energy collected from the illuminated region will be derived by way of multiple three-dimensionally offset views, and provide the resulting aperiodic lattice additional power to resolve image ambiguities and enhance the three-dimensional imaging capability. Once captured by their respective energy receiver sections, the RF reference signal energy and the RF image energy are digitized and stored, so that they may be readily coupled to a correlation-based image data processing section.

The correlation based image data processing section assumes that the source of RF energy illuminating the three-dimensional spatial volume of interest is located at some fixed location in space. Where the scattered RF energy collector is used to simultaneously collect non-scattered energy emitted from the reference signal source, termed a 'self-referential' embodiment, the received signal y(t) produced by the RF energy collector contains the direct path signal from the illumination source to the collector plus time-delayed, Lorentz-transformed RF energy scattered from the illuminated region.

Because the coordinates of the source of the reference signal are spatially displaced from the location of a respective illuminated point, there is a time delay associated with the reference signal's travel path from the illumination source to the potential scattering location, and also a time delay associated with the reference signal's travel time from the reference signal source to the RF energy collection aperture. In addition, there is a time delay associated with the travel time of the RF energy scattered from the illuminated location to the scattered image energy collector. In order correlate the reference signal with the RF energy signal received by the moving collector, it is necessary to account for these delays, as well as the time-scaling of the signal received by the energy collector resulting from the fact its platform is moving relative to the illuminated location.

The signal received at the dynamic collector is subjected to a first Lorentz transform and delay operation to transform the reference signal component of the energy received at the collection aperture to the illuminated location. The received signal is further subjected to a second Lorentz transform which accounts for signal propagation delay and performs a Lorentz transform from its moving frame of reference to the static frame of reference of the illuminated point. In the self referential embodiment, the received signal at the dynamic collection aperture contains the reference illumination signal, which is removed/nulled out by means of a reference signal suppression operator.

The reference signal is then correlated with the scattered signal over a relatively long integration interval, such as one on the order of several tens of seconds to several tens of minutes, or longer, sufficient to collect enough valid scattering energy associated with a prescribed signal-to-noise ratio, with scattered energy values associated with RF frequency from the reference source illuminating the scattered location constructively combining, whereas all others destructively cancel. This produces, for the illuminated location, a scattering coefficient which is a complex interference pattern (containing both amplitude and phase components) containing all the information necessary to recreate a three-dimensional monochromatic image of the illuminated scene.

The output of the correlator may be coupled to a downstream image utility subsystem for generation of the three-dimensional image of the scene. The resolution to which the illuminated scene may be imaged (three-dimensionally) is limited by the Rayleigh wavelength (i.e., one-half the wavelength) of the illuminating reference source.

Now, even through the image generation scheme of the '637 application described above provides the ability to passively collect and process RF energy emitted by a relatively powerful RF illumination source into a three-dimensional image of cultural features of a dynamically observed terrestrial region of interest, it can be expected to require a relatively lengthy period of time (e.g., on the order of several to tens of minutes of more) for collection (typically over multiple passes along two or more mutually three dimensionally offset observation paths extending horizon-to-horizon) of sufficient data that can be correlated for the generation of an image whose image points have an acceptable signal-to-noise ratio.

SUMMARY OF THE INVENTION

In accordance with the present invention, this relatively long energy collection period can be substantially reduced by using an energy illumination and collection aperture that effectively corresponds to that employed in synthetic aperture radar (SAR) applications. Rather than collecting energy emitted from a single narrowband illuminating RF source from multiple views associated with relatively lengthy (e.g. horizon-to-horizon) energy collection paths, the present invention collects RF energy scattered by cultural features with a spatial volume illuminated by a plurality of spectrally different narrowband RF emission sources, having a spectrally composite waveform that is functionally equivalent to a wideband illumination source.

The use of such a composite wideband RF signal source enables a first dimension of cultural features of the illuminated region to be resolved to a relatively fine resolution—on the order of that obtainable for range measurements in SAR systems. A second dimension of the imaged region corresponds is generally orthogonal to the range dimension, and corresponds to the azimuth component of the collected wideband energy signal. As in an SAR system, the extent to which the azimuth component is resolvable is defined by the spatial energy collection window along a single travel path of the scattered energy collector's dynamic platform, as it overflies the illuminated region. Such a wideband energy collection window is typically on the order of a few to several tens of seconds, rather than minutes. As a result, the invention is able to produce scattering coefficients associated with the viewed scene (in two dimensions) in a relatively short period of time.

Not only may the respective RF frequencies of the various illumination sources not necessarily spectrally overlap or be spectrally contiguous, but they can be expected to mutually non-coherent. This means that, in order to realize a useful image, the phase components of the scattering coefficients obtained from the viewed region of interest for each illumination frequency must be adjusted to correct for their mutually differential offsets. To correct for this phase incoherence, a respective set of scattering coefficient data obtained for each illumination source is applied to a cultural feature extraction operator, such as a conventional edge detection operator, in order to locate a relatively strong cultural feature that is spatially common to multiple images.

The extracted cultural feature is used as a commonality connector to provide a phase coherence correction base for plural sets of scattering coefficient data. In particular, the extracted cultural feature is applied to a standard electromagnetic waveform analysis tool, that is operative, for each narrowband RF signal source for which the cultural feature has been identified, to calculate a set of scattering coefficients that should be theoretically produced as a result of an illumination by that frequency of spatial points that lie along the extracted cultural feature. The phase values of these calculated scattering coefficients are then compared with the actual measured phase values of the scattering coefficients as determined for RF energy passively collected from the dynamic collection aperture for the illumination source at the corresponding frequency.

The difference between the phase values of the two sets of coefficients (tool-calculated and scattered energy collection-based) for the extracted cultural feature represents a phase offset value that needs to be imparted to the measured scattering coefficient values for all spatial points in the illuminated region. Once this phase correction has been made for a given illumination frequency, all of the scattering coefficients for the set of data associated with that particular illumination frequency are effectively tied to a common phase coherence reference. This allows the scattering coefficients of that narrowband frequency set to be coherently combined with those of another spectrally different narrowband set of scattering coefficients whose phase components have been similarly corrected, based upon the same extracted cultural feature. Namely, the extraction of a cultural feature that is common to two or more sets of scattering coefficient data respectively associated with two or more illumination frequencies is used as a spatial reference for enabling phase coherence adjustment of all of the data points of each set for those illumination frequencies.

It should be noted that a given cultural feature that is common to two or more data sets may not be common to the data sets for all frequencies. In this case, one or more additional cultural features may need to be extracted in order to phase-coherence link all of the data sets together. Once each of the measured sets of scattering coefficients have been phase corrected, as described above, they may be coherently combined to provide a composite scattering coefficient data set, from which a two-dimensional image of the viewed scene (in terms of azimuth and range dimensions) may be generated.

DETAILED DESCRIPTION

Figure 1:
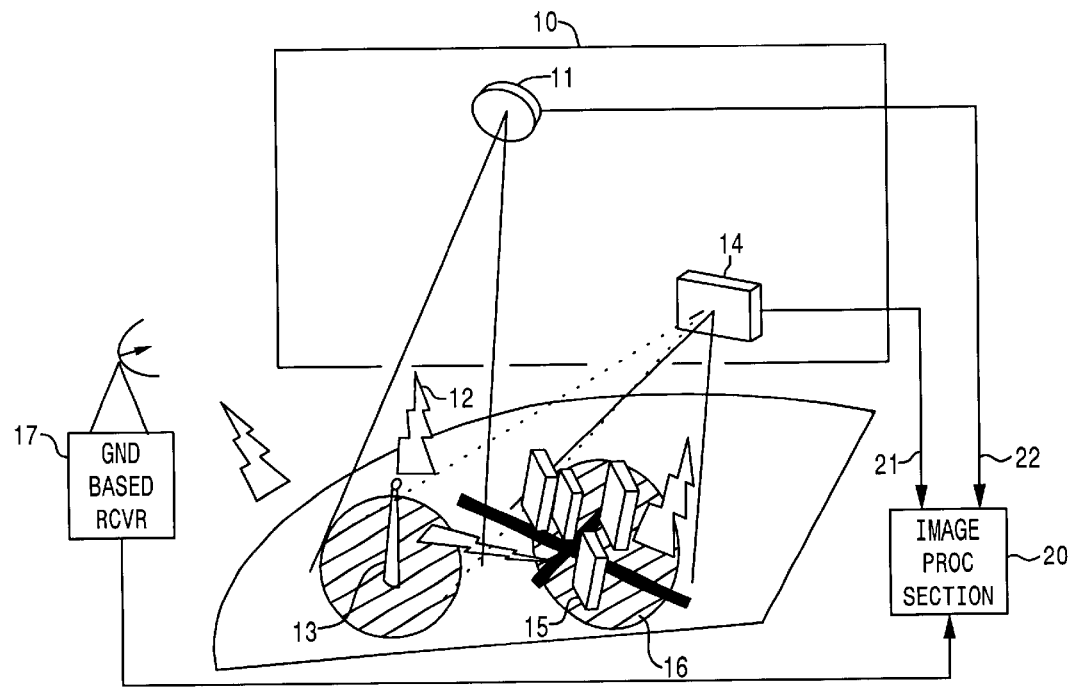
FIG. 1 diagrammatically illustrates the architecture of the passive image generation system of the invention described in the above-referenced '637 application.
Figure 2:
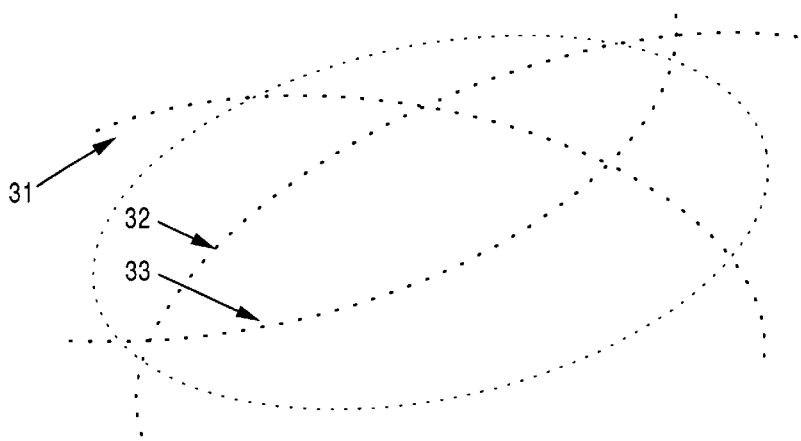
FIG. 2 shows a scattered RF image energy collector coupled with a platform overflying an illuminated region by way of a plurality of respectively different, non-parallel 'fly-by', paths.

Before describing in detail the new and improved composite wideband RF signal based image generation scheme of the present invention, it should be observed that the invention resides primarily in a prescribed arrangement of conventional radio wave collection subsystems and components, and associated digital processing equipment that processes digital data representative of scattered RF energy received by the radio wave collection subsystems, in order to derive pixel/voxel data representative of cultural features of a region illuminated by RF energy illuminating a particular scene of interest.

Consequently, the configuration of the image generation system of the invention has, for the most part, been illustrated in the drawings by readily understandable block diagrams, which show only those specific details that are pertinent to the present invention, so as not to obscure the disclosure with details which will be readily apparent to those skilled in the art having the benefit of the description herein. Namely, the diagrammatic illustrations to be described are primarily intended to show the major components of the invention in a convenient functional grouping, whereby the present invention may be more readily understood.

As noted previously, rather than collecting energy emitted from a single narrowband illumination RF source from multiple views associated with relatively lengthy (e.g. horizon-to-horizon) energy collection paths, the RF energy collection and processing system of the present invention collects RF energy scattered by cultural features with a spatial volume illuminated by a plurality of spectrally different narrowband RF emission sources, having a spectrally composite waveform that is functionally equivalent to a wideband illumination source. Still, as the manner in which the collected reference and scattered energy for each respective narrowband source is initially processed to obtain a respective sets of scattering coefficients is essentially the same as that employed in the system described in the '637 application, it is initially useful to review that scheme as a precursor to setting forth the manner in which the respectively different sets of scattering coefficients are processed in accordance with the present invention.

More particularly, FIG. 1 diagrammatically illustrates the passive RF energy collection and processing scheme of thee '637 application as having a front end, RF energy collection section 10, which contains a reference signal collector (antenna) 11 to collect non-scattered RF energy 12 emitted by an RF source 13 (such as a commercial television broadcast tower) illuminating a three-dimensional volume space 16 containing one or more cultural features 15 of interest (such as buildings and contents thereof). The front end section further includes a scattered image energy collector 14 that collects RF energy that has been scattered— reflected from various points of the cultural features 15 of the illuminated terrestrial region.

As non-limiting examples, the reference and scattered energy collectors may comprise respective (airborne or spaceborne) RF energy collection platforms, containing their own antenna and receiver subsystems. In an alternative configuration, both the reference signal collector and the scattered or image energy collector may use a common RF energy collector, or respectively separate energy collectors located on the same platform. As a further variation, the scattered energy collector may be located on an airborne or spaceborne platform and the reference signal collector may comprise a ground-based receiver, as shown at 17.

Regardless of the energy collection arrangement employed, scattered RF energy collection is dynamic in plural non-coincident travel paths, to ensure that energy collected from the terrestrial region of interest will be derived from mutually orthogonal perspectives, thereby gathering three-dimensionally scattered RF energy from cultural features in the illuminated region. Once captured by their respective energy receiver sections, the RF reference signal energy and the RF image energy are digitized and stored, for processing by image processing section 20.

Figure 3:
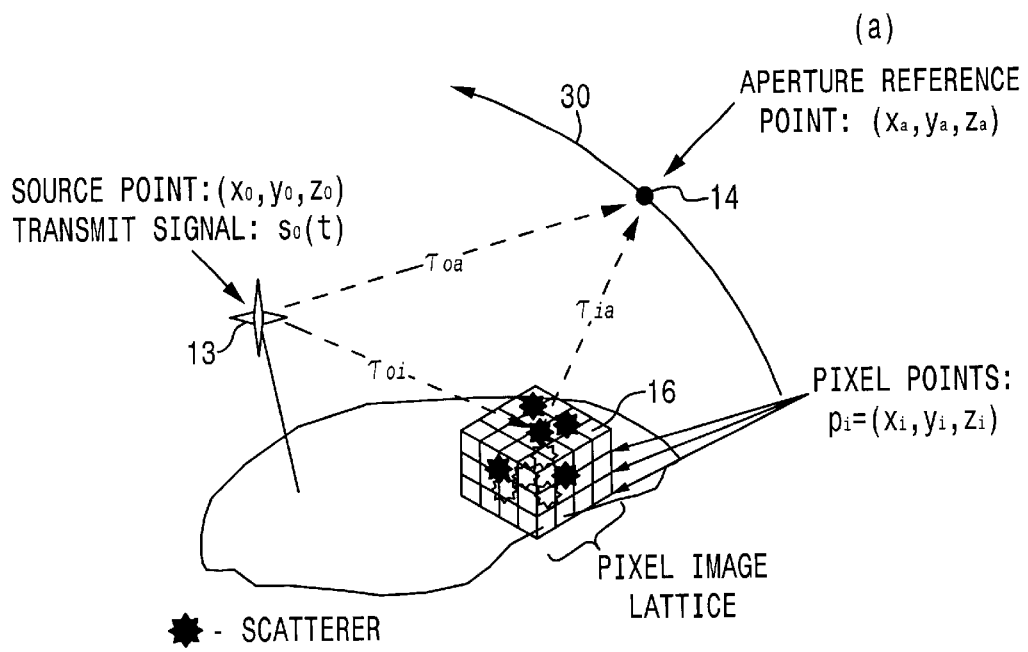
FIG. 3 depicts the image processing mechanism performed by the RF energy processing section of the system of FIG. 1.

FIG. 3 diagrammatically illustrates the overall mechanism that is carried out by the image processing section to obtain a set of (spatially orthogonal scattering coefficient values) for the case of an arbitrary, illuminated location (pixel or voxel point $p_i$), defined by a respective set of (three-dimensional) cartesian coordinates ($x_i$, $y_i$, $z_i$) within the volume of space 16 illuminated by reference source 13. In terms of the diagrammatic illustration of FIG. 1, the source 13 of RF energy illuminating the three-dimensional spatial volume of region 16 is denoted as a reference signal source $s_o(t)$, assumed to be located at some fixed known a priori location in space, having coordinates ($x_0$, $y_0$, $z_0$)

A respective location of a scattered RF energy collector 14 (as it moves along a respective travel path 30 above and past the illuminated region 16) is defined by a set of collection aperture (a) coordinates ($x_a$, $y_a$, $z_a$), which may be readily provided by precision navigation instrumentation, such as a GPS-based position location subsystem. The signal processing scheme of FIG. 3 may be considered to be a 'self-referential' embodiment, in that the collector 14 is used to simultaneously collect both scattered RF energy from the illuminated scene, as well as non-scattered energy emitted from the reference signal source $s_o(t)$. Namely, a received signal y(t) produced by the RF energy collector 14 contains the direct path signal $s_o(t)$ from the source 13 to the collector 14, as well as time-delayed, Lorentz-transformed RF energy that may be scattered or reflected from the illuminated location $p_i$, and incident upon the collection aperture (a) of the collector 14.

The signal Y(t) may be represented in equation (1) as:

$$y(t) = (g_{oa}/r_{oa}) *$$
$$s_o(\Upsilon_{oa}[t-(r_{oa}/c)] + \sum_i (g_{oia}\sigma_i^{1/2}/r_{oi}r_{ia})s_o(\Upsilon_{ia}[t-(r_{oi}+r_{ia})/c]) \quad (1)$$

where the first term corresponds to the direct path signal from the source $s_o(t)$, and the second, summation term corresponds to the scattered signal from the illuminated location $p_i$. The components of equation (1) may be defined as follows:

c=the speed of light;

t=time as measured in the moving collection aperture (a) frame of the collector 14;

$g_{oa}$=the gain power factor for the path from the source 13 to the aperture of the moving collector 14;

$g_{oia}$=gain power factor for the path from the source 13 to the ith scatterer at illuminated location $p_i$ to the collection aperture of the collector 14;

$r_{oa}$=the distance from the source 13 to the collection aperture of the collector 14;

$r_{oi}$=the distance from the source 13 to the ith scatterer;

$r_{ia}$=the distance from the ith scatterer at illuminated location $p_i$ to the collection aperture of the collector 14;

$\gamma_{oa}$=Lorentz time scaling for the path from the source 13 to the collection aperture of the collector 14;

$\gamma_{ia}$=Lorentz time scaling for the path from the potential scatterer location $p_i$ to the collection aperture of the collector 14; and $\sigma_i$=the scattering coefficient for the ith scatterer at illuminated location $p_i$.

The Lorentz time scaling $\gamma_{oa}$ may be defined as:

$$\gamma_{oa} = (1 - r_{oa}/c)/(1-(r_{oa}/c)^2)^{1/2} \quad (2).$$

The Lorentz time scaling $\gamma_{ia}$ may be defined as:

$$\gamma_{ia} = (1 - r_{ia}/c)/(1-(r_{ia}/c)^2)^{1/2} \quad (3).$$

The gain power factor $g_{oa}$ may be expressed as:

$$|g_{oa}|^2 = \lambda^2 G_t(\hat{a}_{oa})G_r(\hat{a}_{oa})/16\Pi^2, \quad (4)$$

and the gain power factor $g_{oia}$ may be expressed as:

$$|g_{oia}|^2 = \lambda^2 G_t(\hat{a}_{oi})G_r(\hat{a}_{ia})/64\Pi^3, \quad (5)$$

where $G_t$, $G_r$ are respective gains of the transmitting antenna of the illuminating source 13 and the receiver antenna(s) of collector 14, the values a are path unit vectors, and $\lambda$ is the wavelength of the RF signal transmitted by source 13.

It should be noted that the coordinates $(x_0, y_0, z_0)$ of the reference signal source $s_o(t)$ need not specify the exact location of the transmitter 13. As long as the coordinates $(x_0, y_0, z_0)$ are reasonably proximate to the actual location of the reference signal source $s_o(t)$, the processed result for the illuminated location $p_i$ (and all others) will be spatially shifted from the image produced if the coordinates of the source 13 were known with precision; as a consequence, the generated scene will simply be a spatially shifted image, containing the same resolvable cultural details that would be obtained were the exact location of the phase center of the transmitter's emitted RF signal known a priori.

Because the coordinates $(x_0, y_0, z_0)$ of the source of the reference signal $s_o(t)$ are spatially displaced from the location $(x_i, y_i, z_i)$ of the illuminated point $p_i$ of interest, there will be a time delay shown by broken lines $\tau_{oi}$ associated with the reference signal's travel path from the source $s_o(t)$ to the potential scattering location $p_i$, and a time delay shown by broken lines $\tau_{oa}$ associated with the reference signal's travel time from the reference signal source $s_o(t)$ to the RF energy collection aperture at coordinates $(x_a, y_a, z_a)$ In addition, broken lines $\tau_{ia}$ represent the time delay associated with the travel time of the RF energy scattered from the illuminated location $p_i$ to the received image signal coordinates $(x_a, y_a, z_a))$ of the scattered image energy collector 14.

In order to properly correlate the reference source signal $s_o(t)$ emanating from the source 13 with the RF energy signal y(t) received by the moving collector 14, it is necessary to account for these delays, as well as the time-scaling of the signal received by the energy collector 14 resulting from the fact its platform is moving relative to the illuminated location $p_i$. These adjustments are shown in the correlation signal processing diagram of FIG. 4.

In particular, the received signal y(t) as collected by the collector 14 at the RF energy collection aperture coordinates $(x_a, y_a, z_a)$ is applied to a first processing path that includes a first Lorentz transform operator 41. This first Lorentz transform operator accounts for the delay $\tau_{oa}$ and performs the first Lorentz transform $\gamma_{oa}$ of the signal y(t) from its moving frame of reference at collection aperture location $(x_a, y_a, z_a)$ to the static frame of reference of illuminated location $p_i$.

The output of the first Lorentz transform operator 41 is then applied to a delay 43, which imparts a delay $\tau_{oi}$ associated with the reference signals travel time from the source $s_o(t)$ to the illuminated location $p_i$ The combined effect of this first Lorentz transform and delay operation serves to transform the reference signal component of the energy received by the collector 14 to the location $p_i$ The output of delay 43 is coupled as a first input 42 of a correlation multiplier 44.

The received signal y(t) is further applied to a second processing path that includes a second Lorentz transform operator 45, which accounts for the delay $\gamma_{ia}$ and performs a second Lorentz transform $\tau_{ia}$ of the received signal y(t) from its moving frame of reference at location $(x_a, y_a, z_a)$ to the static frame of reference of location $p_i$. Because the 'self referential' system of FIG. 3 provides for the collection of both the scattered energy and reference illumination signals by means of a common energy collector 14, the received signal y(t) also contains the reference illumination signal $s_o(t)$ (which can be expected to be a substantial or dominant portion of the received signal).

Figure 5:
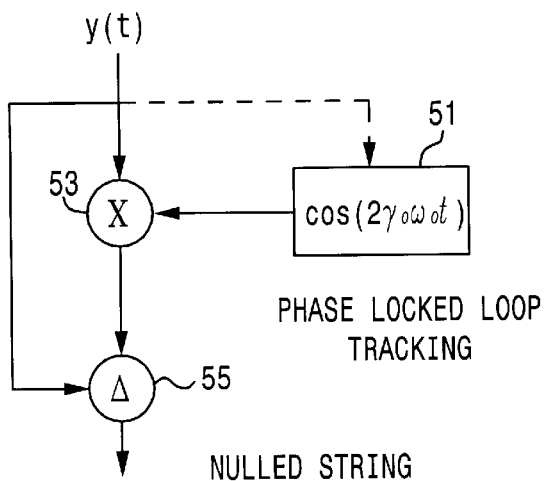
FIG. 5 shows an example of a reference signal suppression operator.
Figure 6:
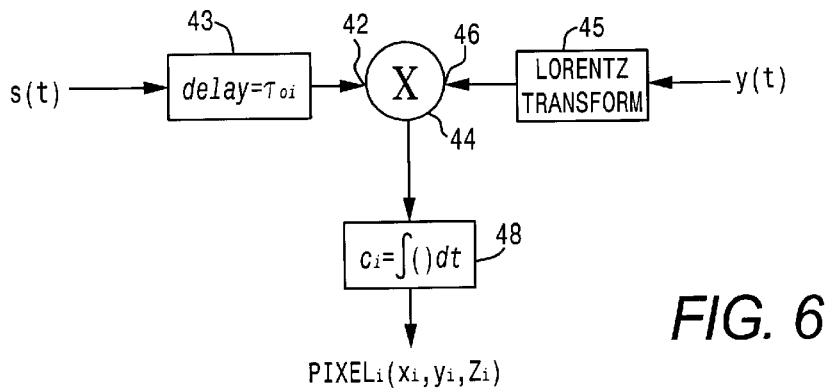
FIG. 6 shows a reduced complexity correlation signal processing diagram.

In order remove the reference signal component $s_o(t)$ from the desired scattered image component of the received signal y(t), the output of the second Lorentz transform $\tau_{ia}$ operator 45 is coupled to a reference signal suppression or 'correlation discriminant' operator 47, such as the spectral inversion-based mechanism shown in FIG. 5, that serves to effectively null out the amplitude of the reference signal component. For this purpose, the received signal y(t) is coupled as an input to a phase locked loop tracking operator 51, which produces an output representative of cos $(2\gamma_o\omega_o t)$. This frequency shifted signal is then multiplied in a multiplier 53 by the signal y(t), to produce a spectral inversion of the received signal, that places the desired information signal (containing the scattered information) at a sideband of the illuminating reference. This spectrally inverted version of the received signal is then differentially combined with the received signal y(t) in differential combiner 55, which excises or nulls out the spectrally coincident reference component in the two multiplied signals, leaving only the desired scattered energy component. The resultant reference-nulled signal output by the reference signal suppression operator 47, which represents the scattered component of the receive signal y(t) as transformed to the illuminated location $p_i$, is coupled as a second input 46 of the correlation multiplier 44.

Where the scattered energy signal and the reference signal are collected by separate energy collectors, the signal y(t) provided by the energy collector 14 will not contain a potentially dominant reference signal component that requires removal, as described above. In this instance, as shown in FIG. 6, the signal y(t) is applied only to the Lorentz transform operator 45, the output of which Is coupled to the second input 46 of multiplier 44. Also, where a copy of the reference signal $s_o(t)$ at illumination source location $(x_0, y_0, z_0)$ is available, no Lorentz transform of the illuminating reference signal is necessary; instead, the reference signal need only be coupled through a delay 43 to compensate for the travel time delay $\tau_{oi}$, with the output of delay 43 being coupled to the first input 42 of the multiplier 44 as described above.

Figure 4:
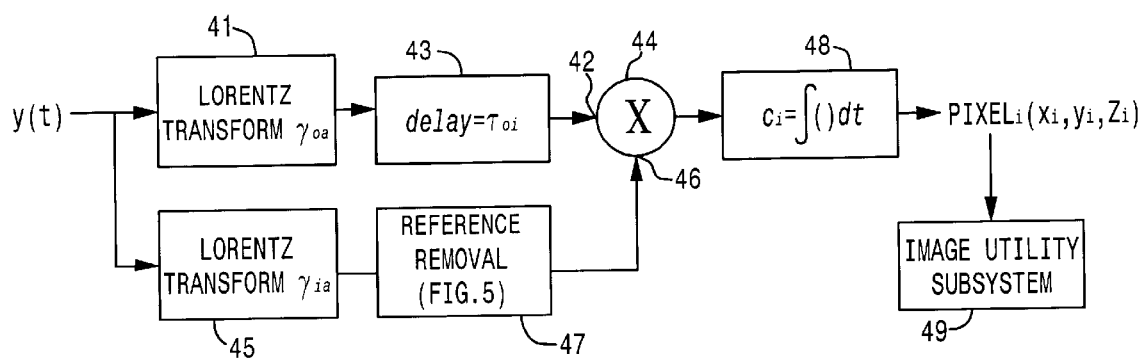
FIG. 4 is a correlation signal processing diagram associated with the operation of the RF energy processing section of FIG. 1.

As shown in FIGS. 4 and 6, the multiplier 44 multiplies the reference signal transform $\gamma_{oa}$ based component at its input 42 by the scattered signal transform $\gamma_{ia}$ based component at its input 46, so as to produce a product that is summed or integrated by a correlation integrator 48. The integration period of integrator 48 is of a relatively long duration (which may be on the order of several tens of seconds to several tens of minutes, as a non-limiting example), that is sufficient to ensure that only scattered energy values associated with RF frequency from the source $s_o(t)$ illuminating the location $p_i$ will constructively combine. However, all others will destructively cancel, leaving as a valid scattering coefficient information $c_i$ for illuminated location $P_i$ only that derived from reference signal energy emanating from the transmission reference signal source 13.

Figure 7:
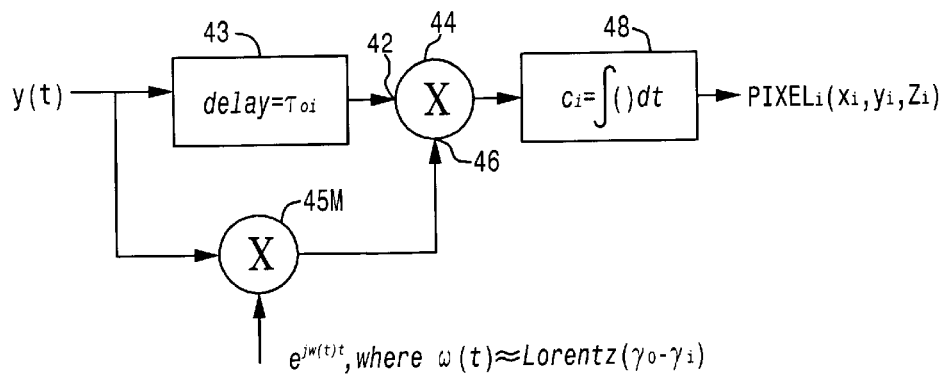
FIG. 7 shows a reduced complexity implementation of the correlation signal processing diagram of FIG. 4.

FIG. 7 shows a reduced complexity implementation of the correlation signal processing diagram of FIG. 4, where the differential Lorentz transform operators are replaced by a Doppler shift mechanism. In this case the Lorentz transform operator 41 is removed and the Lorentz transform operator 45 is replaced by a multiplier 45M, to which the signal y(t) and the signal $e^{j\omega(t)}$ are applied, where $\omega$ (t)=Lorentz ($\gamma_{oa} - \gamma_{ia}$)

The scattering coefficient information obtained from the mutually orthogonally offset dynamic energy collection geometries and associated correlation-based image processing is a complex interference pattern (containing both amplitude and phase components) having all the information necessary to recreate a three-dimensional monochromatic image of the cultural features of the illuminated region 16. This scattering coefficient data may be coupled to a downstream image utility subsystem 49, such as but not limited to a virtual reality simulator, multi-image slice display device, and the like, for generation of the three-dimensional image of the scene.

The resolution to which the illuminated scene may be imaged is limited by the Rayleigh wavelength (i.e., one-half the wavelength) of the illuminating reference source $s_o(t)$. As a non-limiting example, for an illuminating coherent RF frequency on the order of 50 MHz, the image feature resolution may be on the order of ten feet, while for an illuminating frequency on the order of 500 MHz, the image feature resolution may be on the order of one foot.

As pointed out briefly above, unlike the system described in the above-referenced '637 application (diagrammatically illustrated in FIG. 1), which collects and processing RF energy emanating from a single narrowband RF source, the wideband image generation system of the present invention is operative to collect and process RF energy reflected —scattered from a three-dimensional space being illuminated by a plurality of RF energy sources. For purposes of providing a non-limiting example of a reduced complexity architecture of such a multi-emitter based system, FIG. 8 diagrammatically shows two narrowband signal sources 13-1 and 13-2.

Figure 9:
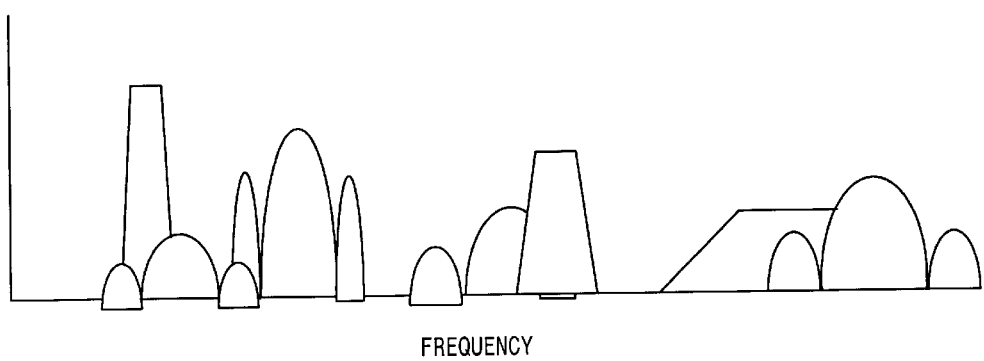
FIG. 9 is a spectral diagram of wideband RF energy sourced from a plurality of narrowband RF illumination sources.

Like the source 13 in the system of FIG. 1, narrbwband signal sources 13-1 and 13-2 may comprise commercial television transmitters broadcasting at respectively different frequencies, and located in illumination proximity to the terrestrial region 16 containing cultural features (e.g., buildings and contents thereof) 15 of which a two-dimensional image is to be generated. It should be observed, however, that the present invention is not limited to the use of two or any other multiple number of spectrally diverse narrowband RF signal sources. From a practical standpoint, it can be expected that the wideband illumination RF energy would be a composite of energy sourced from some N number of narrowband sources, as shown in the spectrum diagram of FIG. 9.

Figure 8:
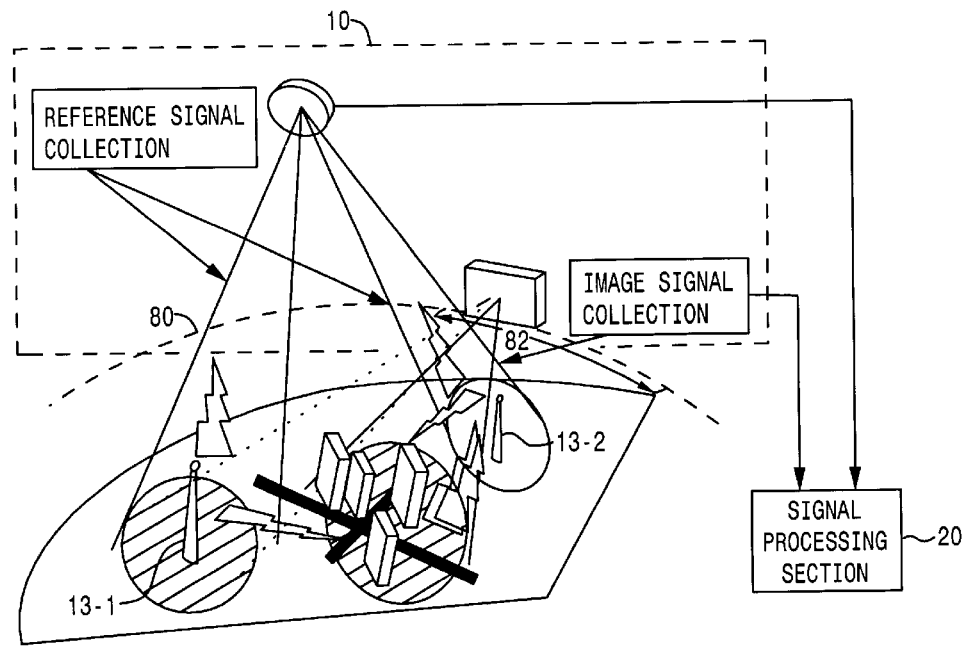
FIG. 8 is a reduced complexity diagrammatic illustration of the wideband passive image generation system of the present invention.

In addition, in the system of FIG. 8, the dynamic platform carrying the scattered RF energy collector 14 and/or the reference signal collector 11 is shown as traveling along a path 80. During some prescribed (azimuth-associated) travel window 82 of the energy capture platform within this path (which may have a duration on the order of several seconds to tens of seconds, for example, as described above), the RF energy collection system 10 is turned on. During this active interval, the energy collection system operates in the same manner as the system of FIG. 1, described above, so as to gather, for each of the narrowband illumination sources, respective sets of RF reference signal energy and scattered RF energy. As in the signal illumination source-based system of FIG. 1, each set of collected energy data is digitized and stored, for processing by processing section 20.

Thus, while the components and operation of the energy collection portion of the system of FIG. 8 are essentially the same as those of FIG. 1, the system of FIG. 8 differs from that of FIG. 1 in two respects. First, as in an SAR application, the terrestrial region 16 to be imaged is actively viewed (from which wideband rather than narrowband energy is collected) during only a prescribed window 82 (which corresponds to the spatial resolution of an azimuth component of a to-be-generated two-dimensional image) of the dynamic observation platform as it travels along path 80. Secondly, rather than collecting a single set of data for one narrowband frequency (source 13 in FIG. 1), the system of FIG. 8 collects a composite of wideband data corresponding to a plurality of N data sets, respectively associated with the number N of spectrally diverse narrowband RF energy sources (two of which are shown at 13-1, 13-2) illuminating the region 16.

Within the processing section 20, each collected data set as derived for a respectively different one of the narrowband illumination sources is processed as described above with reference to FIGS. 3–7. As a result, for the wideband embodiment of the present invention, plural N sets of scattering coefficients, respectively associated with the N narrowband illumination sources are obtained. As noted above, the respective RF frequencies of this set of N illumination sources can be expected to mutually non-coherent. As a consequence, in order to realize a useful image, the phase components of the respective N sets of scattering coefficients obtained by the image processing system must be adjusted to correct for their mutually differential offsets.

Figure 10:
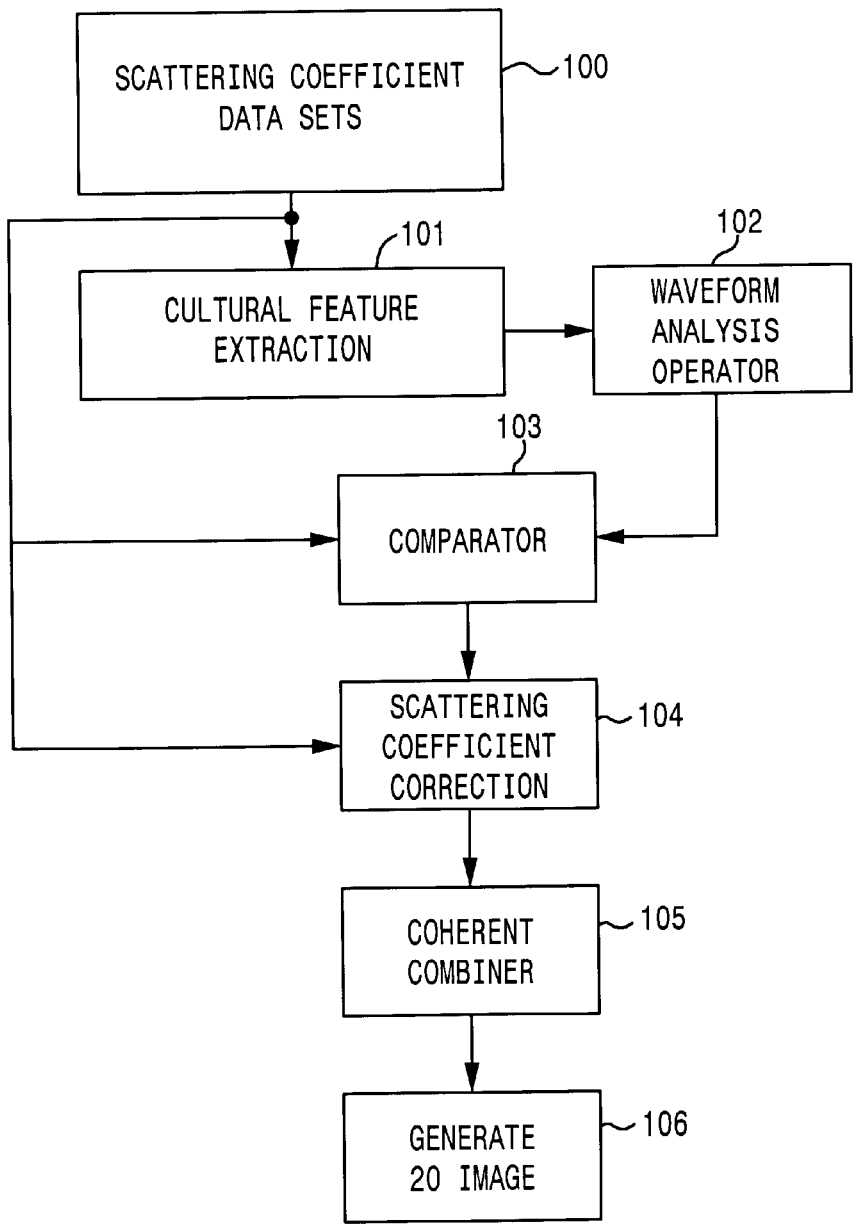
FIG. 10 shows a data processing mechanism for correcting for phase incoherence among scattered coefficients derived for multiple narrowband illumination sources.

FIG. 10 shows a wideband image processing mechanism 21 that is executed within the processing section 20 to correct for this phase incoherence. In order to provide a phase coherency correction reference for different scattering coefficient data sets, it is necessary to tie respective ones of the data sets to one another. As pointed out above, this may be readily accomplished by searching for one or more of the same relatively well defined cultural features, such as a corner or edge, in multiple ones (and preferably all of the data sets).

For this purpose, a respective ith scattering coefficient data set of the N sets of data 100 is coupled to a cultural feature extraction operator 101. As a non-limiting example, the cultural feature extraction operator employed may comprise a conventional edge detection operator. The geometry parameters of the cultural feature located in the ith scattered coefficient data set by the cultural feature extraction operator 101 are coupled to a standard electromagnetic waveform analysis operator 102. In addition, cultural feature extraction operator 101 outputs the scattering coefficients for the ith data points that lie along the extracted feature.

The electromagnetic waveform analysis operator 102 is operative to calculate a set of theoretical scattering coefficients that should be produced as a result of an illumination by that ith frequency of spatial points that lie along the extracted cultural feature. The phase values of these calculated scattering coefficients are then compared in a comparator 103 with the actual measured phase values of the scattering coefficients of the ith data set, as output by cultural feature extraction operator 101.

The difference between the phase values of the two sets of coefficients (tool-calculated and energy collection-based) for the extracted cultural feature as derived by comparator 103 is coupled to a scattering coefficient correction operator 104, which adjusts each of the measured scattering coefficient values for all spatial points in the ith data set by the determined phase difference. Once this phase correction has been made for a given illumination frequency, all of the scattering coefficients for that ith set of scattering coefficient data associated with that ith particular illumination frequency are effectively tied to a common phase coherence reference.

As noted previously, this enables scattering coefficients of the ith set to be coherently combined with those of another jth set of scattering coefficients whose phase components have been similarly corrected, based upon the same extracted cultural feature. Also, a given cultural feature that is common to two or more (e.g., ith and (i+k) th data sets may not be common to the (1-N) data sets for all N frequencies. In this case, one or more additional cultural features may need to be extracted in order to phase-coherence link all of the data sets together. After the N sets of scattering coefficients have been phase corrected in the manner described above, they are coherently combined at 105 to provide a composite wideband scattering coefficient data set. As the coordinates of this data set are defined in the azimuth and range dimensions only, the data set can be used to generate a two-dimensional image of the viewed region, as shown at 106.

As will be appreciated from the foregoing description, the passive imaging system of the present invention takes advantage of RF daylight created by multiple narrowband RF illumination sources, to passively produce respective sets of RF scattering coefficients associated with the frequencies of the plural illumination sources for multiple points within a prescribed region illuminated by the RF transmitters. The scattering coefficients of each respectively different frequency set provide a complex interference pattern having amplitude and phase components and containing information necessary to recreate a two-dimensional image of the illuminated scene.

To correct for the lack of mutual coherence among different RF illumination sources, the respective sets of scattering coefficient data obtained for each narrowband illumination source are applied to a cultural feature extraction operator, to locate one or more strong cultural features spatially common to multiple images. For spatial points along the extracted cultural feature theoretical scattering coefficients are calculated. Differences between phase values of these calculated scattering coefficients and those of the collected and processed scattering energy are used to modify the measured scattering coefficient values for all spatial points in the illuminated region. This allows the scattering coefficients of that narrowband frequency set to be coherently combined with those of another spectrally different narrowband set of scattering coefficients whose phase components have been similarly corrected, based upon the same extracted cultural feature.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of generating an image of a terrestrial region upon which electromagnetic energy from respectively different narrowband energy sources is incident comprising the steps of:

(a) passively collecting electromagnetic energy emitted by said respectively different narrowband energy sources by way of at least one first energy collector;

(b) passively collecting, by at least one second energy collector moving independently and arbitrarily with respect to said respectively different narrowband energy sources among a plurality of distributed energy collection locations, electromagnetic energy emitted by said electromagnetic energy sources and scattered by features of said terrestrial region of interest;

(c) processing a reference signal representative of electromagnetic energy collected in step (a), in accordance with information representative of the collection geometry of said at least one first energy collector and the geolocations of said electromagnetic energy sources, so as to derive a time- and location-corrected reference signal;

(d) correlating the time- and location-corrected reference signal derived in step (c) with image signals representative of electromagnetic energy collected by said at least one moving second energy collector in step (b), so as to derive amplitude and phase values of scattering components for each of said narrowband sources for plural locations of said terrestrial region as received by said at least one moving second energy collector as a function of spatial position; and (e) processing scattering components derived in step (d) for each of said respectively different narrowband sources to produce said multidimensional image of said terrestrial region of interest.

2. A method according to claim 1, wherein said narrowband electromagnetic energy sources comprise television signal transmitters operating at respectively different frequencies, and step (b) comprises passively collecting electromagnetic energy emitted by said television signal transmitters, and scattered by features of said terrestrial region of interest, by means of an airborne or spaceborne electromagnetic energy collection platform moving among said plurality of distributed energy collection locations.

3. A method according to claim 1, wherein step (e) comprises performing phase coherence processing of said scattering components for each of said narrowband sources so as to produce a composite set of scattering component values for said terrestrial region of interest from which said multidimensional image may be generated.

4. A method according to claim 3, wherein step (e) comprises (e1) locating a cultural feature within multiple ones of respective sets of scattering coefficient data obtained for said narrowband illumination sources;

(e2) generating, for spatial points on the cultural feature located in step (e1), theoretical scattering coefficients; and (e3) modifying scattering coefficient values of said scattering coefficient data obtained for said narrowband illumination sources in accordance with differences between phase values generated in step (e2) and those derived in step (d), so as to enable scattering coefficients of one narrowband frequency set to be coherently combined with those of other spectrally different narrowband sets of scattering coefficients.

5. A system for deriving image information representative of cultural features of a terrestrial region illuminated by spectrally different RF transmitters comprising:

a reference signal collection subsystem which is operative to collect non-scattered RF energy emitted by said spectrally different RF transmitters illuminating said terrestrial region;

a dynamic scattered image energy subsystem which is operative to travel past said terrestrial region, moving arbitrarily and independently with respect to said spectrally different RF transmitters and collect RF energy scattered from points of cultural features within said terrestrial region; and a collected signal processing subsystem, which is operative to process information representative of said non-scattered RF energy as collected by said reference signal collection subsystem, to derive coherent reference signals corresponding to those transmitted by said RF transmitter illuminating said terrestrial region, time- and location-corrected as necessary to points within said terrestrial region, and to correlate said coherent reference signals with a scattered RF energy signals representative of electromagnetic energy collected by said dynamic scattered image energy subsystem, time- and location-corrected as necessary to said points within said terrestrial region, so as to derive respective sets of amplitude and phase values of scattering components for said points of said terrestrial region, and is operative to process respective sets of scattering components derived for each of said respectively different narrowband sources to coherently combinable sets of scattering coefficients.

6. A system according to claim 5, further including an image generator subsystem, which is operative to process said sets of scattering components to produce a multidimensional image of cultural features of said terrestrial region.

7. A system according to claim 5, wherein said reference signal collection subsystem and said dynamic scattered image energy subsystem are configured to employ a common RF energy collector that simultaneously collects said non-scattered RF energy emitted by said spectrally different RF transmitters illuminating said terrestrial region, and RF energy scattered from points of cultural features within said terrestrial region.

8. A system according to claim 5, wherein said reference signal collection subsystem and said dynamic scattered image energy subsystem employ respectively separate RF energy collectors that simultaneously collect said non-scattered RF energy emitted by said spectrally different RF transmitters illuminating said terrestrial region, and RF energy scattered from points of cultural features within said terrestrial region.

9. A system according to claim 7, wherein said collected signal processing subsystem includes:

a coherent reference signal processing section having a first Lorentz transform operator that accounts for signal propagation delay from a respective narrowband transmitter to said reference signal collection subsystem, and performs a Lorentz transform of an RF energy signal received thereby to a static frame of reference of a respective point in said illuminated terrestrial region, and a delay associated with said reference signal's propagation time from said respective narrowband transmitter to said respective point, so as to effectively transform a reference signal component of RF energy received at the collection aperture of said reference signal collection subsystem to said respective point, and a dynamic scattered signal processing section having a second Lorentz transform operator which accounts for signal propagation delay and performs a second Lorentz transform of RF energy received by said dynamic scattered image energy subsystem from its moving frame of reference to the static frame of reference of said respective point.

10. A system according to claim 9, wherein said dynamic scattered signal processing section includes a reference signal suppression operator coupled to remove a reference signal component from the scattered image component of RF energy received by said dynamic scattered image energy subsystem.

11. A system according to claim 9, wherein said collected signal processing subsystem includes a correlator, which is operative to correlate the output of said dynamic scattered signal processing section with the output of said coherent reference signal processing section, to derive a respective set of scattering coefficients.

12. A system according to claim 11, further including an image generator subsystem, which is operative to process said amplitude and phase values of scattering components for said points to produce a multidimensional image of cultural features of said terrestrial region.

13. A system according to claim 9, wherein said collected signal processing subsystem is operative to perform phase coherence processing said scattering components for each of said narrowband sources so as to produce a composite set of scattering component values for said terrestrial region from which a multidimensional image may be generated.

14. A system according to claim 13, wherein said collected signal processing subsystem is operative to locate a cultural feature within multiple ones of respective sets of scattering coefficient data obtained for said narrowband illumination sources, generate, for spatial points on the located cultural feature, theoretical scattering coefficients, and to modify scattering coefficient values of said scattering coefficient data obtained for said narrowband illumination sources in accordance with differences between derived and generated phase values, so as to enable scattering coefficients of one narrowband frequency set to be coherently combined with those of other spectrally different narrowband sets of scattering coefficients.

15. A method for passively deriving image information representative of cultural features of a region illuminated by a plurality of spectrally different narrowband RF transmitters comprising the steps of:
(a) providing coherent reference signals representative of RF energy emitted by said spectrally different RF transmitters illuminating said terrestrial region;
(b) collecting, from at least one energy collector moving arbitrarily and independently of said plurality of spatially different narrowband RF transmitters along a prescribed portion of a travel path offset from said terrestrial region, RF energy scattered, as a result of illumination by RF energy emitted by said spectrally different RF transmitters, from points that are capable of defining cultural features within said terrestrial region;
(c) correlating said coherent reference signal, time- and location-corrected as necessary to said points of said terrestrial region, with scattered RF energy signals associated with said spectrally different transmitters and representative of electromagnetic energy collected by said dynamic scattered image energy subsystem, time- and location-corrected as necessary to said points of said terrestrial region, so as to derive respective sets of scattering components for said spectrally different narrowband sources for said points of said terrestrial region; and
(d) performing phase coherence processing of said scattering, components for each of said spectrally different narrowband RF sources so as to produce a composite set of scattering components for said terrestrial region from which a multidimensional image may be generated.

16. A method according to claim 15, wherein step (d) comprises
(d1) locating a cultural feature within multiple ones of respective sets of scattering coefficient data obtained for said narrowband illumination sources;
(d2) generating, for spatial points on the cultural feature located in step (d1), theoretical scattering coefficients; and
(d3) modifying scattering coefficient values of said scattering coefficient data obtained for said narrowband illumination sources in accordance with differences between phase values generated in step (d2) and those derived in step (c), so as to enable scattering coefficients of one narrowband frequency set to be coherently combined with those of other spectrally different narrowband sets of scattering coefficients.

17. A method according to claim 15, further including the step (e) of processing said composite set of scattering components to produce a multidimensional image of cultural features of said terrestrial region.

18. A method according to claim 15, wherein steps (a) and (b) include employing a common RF energy collector to simultaneously collect non-scattered RF energy emitted by said narrowband RF transmitters illuminating said terrestrial region, and RF energy scattered from cultural features of said terrestrial region.

19. A method according to claim 15, wherein steps (a) and (b) include employing respectively separate RF energy collectors to collect RF energy emitted by said narrowband RF transmitters illuminating said terrestrial region, and RF energy scattered from said points of cultural features of said terrestrial region.

20. A method according to claim 15, wherein step (c) comprises:
(c1) processing a respective coherent reference signal in accordance with a first Lorentz transform that accounts for signal propagation delay from a respective narrowband RF transmitter to a collector for said respective coherent signal and performs a Lorentz transform of an RF energy signal received thereby to a static frame of reference of a respective point in a three-dimensional space of said terrestrial region, and providing a delay associated with said reference signal's propagation time from said respective narrowband RF transmitter to said respective point, so as to effectively transform a reference signal component of RF energy received by said collector to said respective point, and
(c2) processing said scattered RF energy signal in accordance with a second Lorentz transform operator which accounts for signal propagation delay and performs a second Lorentz transform of RF energy received by a collector for said scattered RF energy signal from its moving frame of reference to the static frame of reference of said respective point in said three-dimensional space.

21. A method of generating an image of a terrestrial region comprising the steps of:
(a) passively collecting non-scattered electromagnetic energy, emitted by respectively different narrowband electromagnetic energy transmitters illuminating said terrestrial region, at a first, passive, electromagnetic energy collector that is exclusive of any electromagnetic energy transmission element employed by said respectively different narrowband electromagnetic energy transmitters to transmit narrowband electromagnetic energy;
(b) passively collecting, by a second passive electromagnetic energy collector, electromagnetic energy emitted by said narrowband electromagnetic energy transmitters and scattered by features of said terrestrial region of interest, said second passive electromagnetic energy collector moving independently and arbitrarily with respect to said respectively different narrowband electromagnetic energy transmitters illuminating said terrestrial region among a plurality of distributed energy collection locations and being exclusive of any electromagnetic energy transmission element employed by any of said respectively different narrowband electromagnetic energy transmitters;

(c) processing a reference signal representative of electromagnetic energy collected in step (a), in accordance with information representative of the collection geometry of said first energy collection element and geolocations of said electromagnetic energy transmitters, so as to derive a time- and location-corrected reference signal;

(d) correlating said time- and location-corrected reference signal derived in step (c) with image signals representative of electromagnetic energy collected by said moving second energy collector in step (b), so as to derive amplitude and phase values of scattering components for each of said narrowband electromagnetic energy transmitters for plural locations of said terrestrial region as received by said moving second energy collector as a function of spatial position; and (e) processing scattering components derived in step (d) for each of said respectively different narrowband electromagnetic energy transmitters to produce said multidimensional image of said terrestrial region of interest.

22. The method according to claim 21, wherein step (d) comprises correlating said coherent reference signal, time-, and location-corrected as necessary to points of said terrestrial region, with scattered electromagnetic energy signals associated with spectrally different ones of said respectively different narrowband electromagnetic energy transmitters and representative of electromagnetic energy collected by said second electromagnetic energy collector, so as to derive respective sets of scattering components for said spectrally different narrowband electromagnetic energy transmitters for said points of said terrestrial region; and wherein step (e) comprises performing phase coherence processing of said scattering components for each of said spectrally different narrowband electromagnetic energy sources so as to produce a composite set of scattering components for said terrestrial region from which said multidimensional image is produced.

23. The method according to claim 21, wherein step (c) comprises:

(c1) processing a respective coherent reference signal in accordance with a first Lorentz transform that accounts for signal propagation delay from a respective narrowband electromagnetic energy transmitter to a passive collector for said respective coherent signal and performs a Lorentz transform of an electromagnetic energy signal received thereby to a static frame of reference of a respective point in a three-dimensional space of said terrestrial region, and providing a delay associated with said reference signal's propagation time from said respective narrowband electromagnetic energy transmitter to said respective point, so as to effectively transform a reference signal component of narrowband electromagnetic energy received by said passive collector to said respective point, and (c2) processing said scattered electromagnetic energy signal in accordance with a second Lorentz transform operator which accounts for signal propagation delay and performs a second Lorentz transform of electromagnetic energy received by a passive collector for said scattered electromagnetic energy signal from its moving frame of reference to the static frame of reference of said respective point in said three-dimensional space.

24. The method according to claim 21, wherein said narrowband electromagnetic energy transmitters comprise television signal transmission towers transmitting television signals at respectively different frequencies, and step (b) comprises passively collecting electromagnetic energy emitted by said television signal transmission towers, and scattered by features of said terrestrial region of interest, by means of said second passive electromagnetic energy collector that is mounted on an airborne or spaceborne electromagnetic energy collection platform moving among said plurality of distributed energy collection locations.

* * * * *

UNITED STATES PATENT AND TRADEMARK OFFICE
CERTIFICATE OF CORRECTION

PATENT NO. : 6,700,527 B1
DATED : March 2, 2004
INVENTOR(S) : Gayle Patrick Martin and John W. Shipley It is certified that error appears in the above-identified patent and that said Letters Patent is hereby corrected as shown below:

Column 1,
Line 8, insert -- The present invention was developed under a contract with the United States Government. --

Column 6,
Line 14, delete "thee" insert -- the --
Lines 19-20, delete "volume space" insert -- volume of space --
Line 59, delete "($x_o$, $y_o$, $z_o$)" insert -- ($x_o$, $y_o$, $z_o$). --

Column 7,
Line 62, delete "values a are" insert -- values â are --

Column 8,
Line 19, delete "($x_a$, $y_a$, $z_a$)" insert -- ($x_a$, $y_a$, $z_a$). --
Line 48, delete "($x_a$, $y_a$, $z_a$))" insert -- ($x_a$, $y_a$, $z_a$). --
Line 48, delete "location $p_i$" insert -- location $p_i$. --
Line 53, delete "delay $\gamma_{ia}$" insert -- delay $\tau_{ia}$ --
Line 54, delete "transform $\tau_{ia}$" insert -- transform $\gamma_{ia}$ --
Line 65, delete "transform $\tau_{ia}$" insert -- transform $\gamma_{ia}$ --

Column 9,
Line 27, delete "which Is" insert -- which is --
Line 49, delete "$P_i$" insert -- $p_i$ --
Line 59, delete "$\gamma_{ia}$)" insert -- $\gamma_{ia}$). --

UNITED STATES PATENT AND TRADEMARK OFFICE
CERTIFICATE OF CORRECTION

PATENT NO.    : 6,700,527 B1
DATED         : March 2, 2004
INVENTOR(S)   : Gayle Patrick Martin and John W. Shipley It is certified that error appears in the above-identified patent and that said Letters Patent is hereby corrected as shown below:

<u>Column 10,</u>
Line 25, delete "narrbwband" insert -- narrowband --

Signed and Sealed this

Fifteenth Day of June, 2004

JON W. DUDAS
*Acting Director of the United States Patent and Trademark Office*